United States Patent [19]

Lord

[11] Patent Number: 4,527,399

[45] Date of Patent: Jul. 9, 1985

[54] HIGH-LOW SUPERHEAT PROTECTION FOR A REFRIGERATION SYSTEM COMPRESSOR

[75] Inventor: Richard G. Lord, Liverpool, N.Y.

[73] Assignee: Carrier Corporation, Syracuse, N.Y.

[21] Appl. No.: 597,340

[22] Filed: Apr. 6, 1984

[51] Int. Cl.³ .............................................. F25B 41/00
[52] U.S. Cl. ......................................... 62/212; 62/225
[58] Field of Search ...................... 62/228.1, 212, 227, 62/225; 236/92 B

[56] References Cited

U.S. PATENT DOCUMENTS

| | | | |
|---|---|---|---|
| 3,577,743 | 5/1971 | Long | 62/225 X |
| 3,686,892 | 8/1972 | Bassett, Jr. | 62/228.1 X |
| 3,913,347 | 10/1975 | Stevens | 62/227 X |
| 4,167,858 | 9/1979 | Kojima et al. | 62/228.1 X |
| 4,265,091 | 5/1981 | Kobayashi | 62/228.1 X |

Primary Examiner—William E. Wayner
Attorney, Agent, or Firm—Robert H. Kelly

[57] ABSTRACT

A method and control system are disclosed for operating a refrigeration system to protect the refrigeration system compressor from adverse operating conditions. A first signal indicative of the saturation temperature of the refrigerant in an evaporator of the refrigeration system, and a second signal indicative of the temperature of gaseous refrigerant flowing from the evaporator to the compressor of the refrigeration system compressor, are provided to a microcomputer system which processes the first and second signals to determine the superheat of the gaseous refrigerant flowing to the compressor. The microcomputer system generates an alarm signal to shut down operation of the refrigeration system if the detected superheat is less than a lower limit or greater than an upper limit of a normal range of superheat values.

2 Claims, 1 Drawing Figure

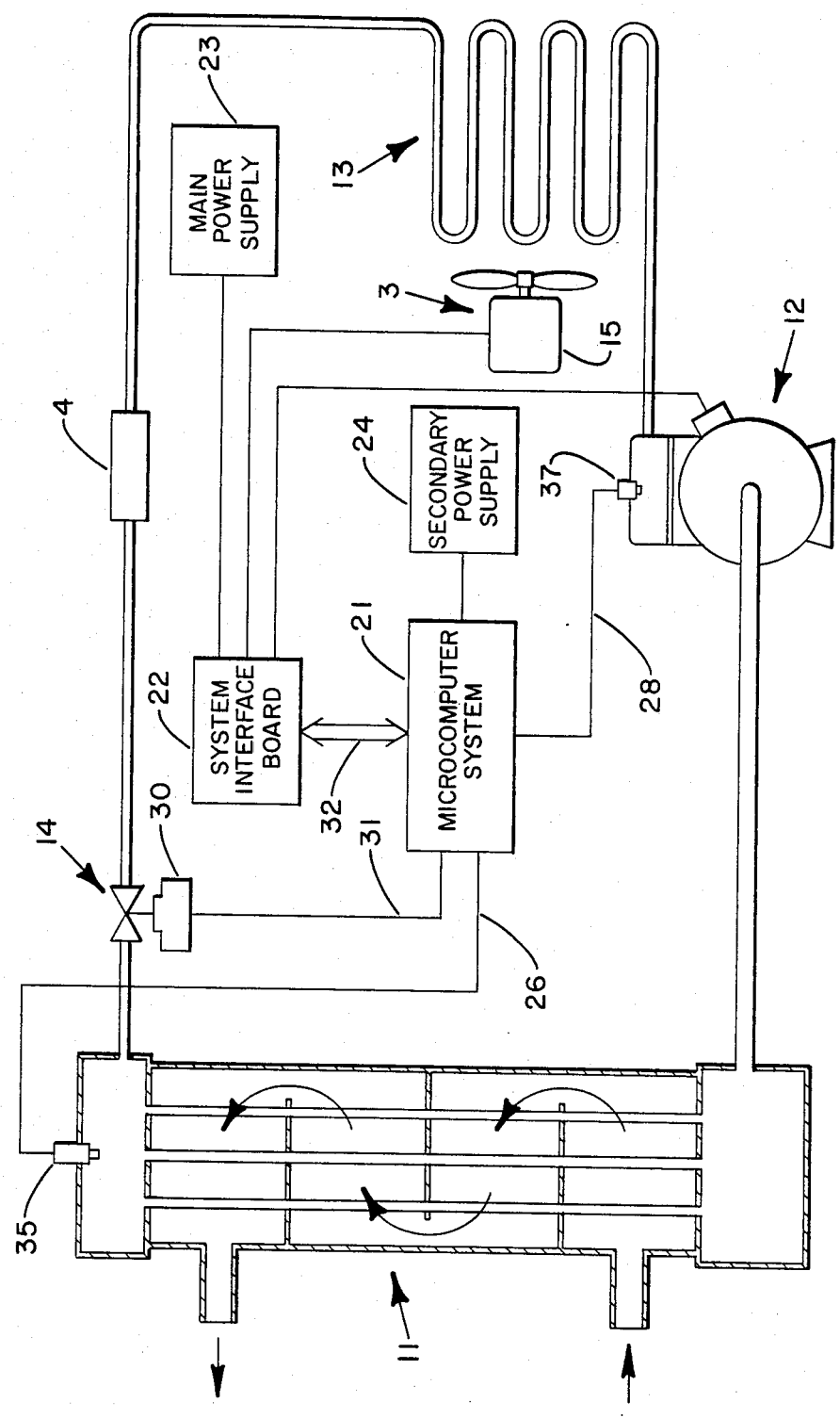

HIGH-LOW SUPERHEAT PROTECTION FOR A REFRIGERATION SYSTEM COMPRESSOR

BACKGROUND OF THE INVENTION

The present invention relates to refrigeration systems and, more particularly, relates to methods and control systems for protecting a refrigeration system compressor from adverse operating conditions.

Conventional refrigeration systems utilize a recirculating refrigerant for removing heat from a low temperature side of the refrigeration system and for discharging heat at a high temperature side of the refrigeration system. The work input necessary to operate the refrigeration system is provided by a motor driven compressor which receives low pressure gaseous refrigerant and compresses it to a high pressure. This high pressure gaseous refrigerant is supplied to a condenser where heat is removed from the gaseous refrigerant to condense it to a liquid. This liquid refrigerant is then supplied through an expansion valve to an evaporator wherein heat is transferred from a heat transfer fluid to the liquid refrigerant to evaporate the liquid refrigerant. The heat transfer fluid is thereby cooled and then used to cool a load, such as to cool a building. The evaporated refrigerant from the evaporator is returned to the compressor for recirculation through the refrigeration system.

The amount of heat absorbed by the refrigerant liquid in the evaporator includes the heat of vaporization of the liquid refrigerant; that is, the amount of heat which must be absorbed by a liquid at a given temperature to convert it to a gas at the same temperature. In addition, the gaseous refrigerant in the evaporator may absorb additional heat which raises its temperature above the temperature of vaporization. Such gaseous refrigerant is said to be superheated, and the amount by which the temperature of the gaseous refrigerant is raised above the vaporization temperature is expressed in degrees of superheat.

The expansion valve and its control system play important parts in overall refrigeration system efficiency and in control of superheat. In many applications of refrigeration systems it is desired to prevent appreciable superheating of the gaseous refrigerant or to regulate the superheat of the refrigerant to a preselected magnitude. Also, in certain applications, to provide ideal operating conditions, the expansion valve should admit an amount of refrigerant that can be evaporated and just slightly superheated in the evaporator. That is, the evaporator should be "wetted" with liquid refrigerant along approximately its entire length to provide heat transfer conditions which maximize the operating efficiency of the refrigeration system.

Normally, regardless of the particular application, the expansion valve and its control system operate to prevent flow of liquid refrigerant from the evaporator to the compressor of the refrigeration system. Also, normally, the expansion valve is designed to move to its fully closed position in response to certain malfunctions detected in the refrigeration system. This is done to protect against liquid refrigerant "flooding" the compressor which may cause damage to the compressor. However, as a result of certain failures, such as the expansion valve itself sticking open, flooding of the compressor is still possible. Also, as a result of certain other failures in the refrigeration system, such as loss of refrigerant charge, a stuck closed expansion valve, or a plugged filter-dryer through which liquid refrigerant flows from the condenser to the expansion valve, too little refrigerant may flow through the evaporator to the compressor causing the temperature of the gaseous refrigerant entering the compressor to reach a dangerously high level which may cause damage to the compressor or have other adverse consequences for the refrigeration system.

SUMMARY OF THE INVENTION

Therefore, it is an object of the present invention to protect a refrigeration system compressor against adverse operating conditions such as flooding of the compressor or dangerously high temperature gaseous refrigerant entering the compressor.

This and other objects of the present invention are attained by a method and control system for operating a refrigeration system to determine the superheat of the gaseous refrigerant entering a compressor in a refrigeration system and for shutting down operation of the refrigeration system in response to abnormal superheat conditions. According to the present invention, the saturation temperature of the refrigerant in the evaporator is sensed and a signal indicative of the sensed temperature is provided to a processor means such as a microcomputer system. Also, the temperature of the gaseous refrigerant entering the compressor is sensed and a signal indicative of this temperature is also provided to the processor means. The processor means compares the provided signals to determine the superheat of the refrigerant flowing from the evaporator to the compressor. The processor means generates an alarm signal if the superheat is continuously above a first selected upper limit for a first selected amount of time or if the superheat is continuously below a second selected lower limit for a second selected amount of time. Whenever an alarm signal is generated by the processor means, the refrigeration system is shut down to protect the refrigeration system compressor from abnormal and possibly detrimental operating conditions.

BRIEF DESCRIPTION OF THE DRAWING

Other objects and advantages of the present invention will be apparent from the following detailed description in conjunction with the accompanying drawing in which:

The FIGURE is a schematic illustration of a refrigeration system with a control system for operating the refrigeration system according to the principles of the present invention.

DESCRIPTION OF THE PREFERRED EMBODIMENT

The FIGURE is a schematic illustration of a refrigeration system having a control system for operating the refrigeration system according to the principles of the present invention. As shown in the FIGURE, the refrigeration system comprises an evaporator 11, a compressor 12, an air-cooled condenser 13, a filter-dryer 4 and an expansion valve 14, connected in the usual manner. Also, as shown in the FIGURE, the control system comprises a microcomputer system 21, a system interface board 22, a main power supply 23, and a secondary power supply 24.

Further, as shown in the FIGURE, a temperature sensor 35 is provided for sensing the saturation temperature of the refrigerant in the evaporator 11. A signal indicative of this sensed temperature is supplied via electrical lines 26 to the microcomputer system 21. Still further, as shown in the FIGURE, a second temperature sensor 37 is provided for sensing the temperature of the gaseous refrigerant entering pistons of the compressor 12. A signal indicative of this sensed temperature is supplied via electrical lines 28 to the microcomputer system 21. Preferably, the temperature sensors 35 and 37 are located and utilized in the refrigeration system in the manner disclosed in U.S. patent application Ser. No. 562,913 entitled "Method and Apparatus For Controlling Refrigerant Flow In A Refrigeration System" which was filed in the U.S. Patent and Trademark. Office on Dec. 19, 1983 and which is assigned to the same assignee as the present patent application. The entire disclosure of this prior commonly assigned United States patent application is incorporated herein by reference. However, it should be noted that, if desired, the temperature sensor 37 may be located in a conventional location, such as in the refrigerant line leading from the evaporator 11 to the compressor 12, and the temperature sensors 35 and 37 may be utilized in a conventional manner to determine superheat of the refrigerant entering the compressor 12.

Also, preferably, the temperature sensors 35, 37 are temperature responsive resistance devices such as thermistors. However, as will be readily apparent to one of ordinary skill in the art to which the present invention pertains, many types of sensors may be employed as temperature sensors 35 and 37. Generally, any type of temperature sensor may be used which is capable of providing a signal indicative of the sensed temperature to the microcomputer system 21.

The microcomputer system 21 may be any device, or combination of devices, suitable for receiving input signals, for processing the received input signals according to preprogrammed procedures, and for generating control signals in response to the processed input signals. The control signals generated by the microcomputer system 21 are supplied to control devices which control the operation of the refrigeration system in response to the control signals provided to the control devices from the microcomputer system 21. For example, the microcomputer system 21 may be a model 8031 microprocessor with a model 2764 memory device which are available from Intel Corporation which has a place of business at 3065 Bowers Avenue, Santa Clara, Calif. 95051.

As shown in the FIGURE, the secondary power supply 24 is connected to the microcomputer system 21 so that the microcomputer system 21 controls electrical power flow from the secondary power supply 24 via electrical lines 31 to a motor 30 which opens and closes the expansion valve 14. Preferably, the expansion valve 14 is an incrementally adjustable electronic expansion valve such as described in U.S. patent application Ser. No. 564,543 entited "Incrementally Adjustable Electronic Expansion Valve" which was filed in the U.S. Pat. and Trdmk. Office on Dec. 22, 1983 and which is assigned to the same assignee as the present patent application. Also, preferably, the expansion valve 14 is controlled in the manner disclosed in U.S. patent application Ser. No. 564,542 entitled "Control System For An Electronic Expansion Valve In A Refrigeration System" which was also filed in the U.S. Patent and Trademark Office on Dec. 22, 1983 and which is also assigned to the same assignee as the present patent application.

The entire disclosures of the foregoing U.S. patent applications are incorporated herein by reference.

Further, as shown in the FIGURE, the system interface board 22 is connected by a ribbon cable 32 to the microcomputer system 21. The system interface board 22 includes switching devices for controlling electrical power flow from the main power supply 23 to a compressor motor for driving the compressor 12 and to a motor 15 for driving a condenser fan unit 3 for circulating cooling air over the condenser 13. Preferably, the switching devices are electronic components, such as relays, which are controlled in response to control signals from the microcomputer system 21 which are supplied through the ribbon cable 32 to the electronic components on the system interface board 22.

According to the present invention, when the refrigeration system is operating, the temperature sensor 35 senses the saturation temperature of the refrigerant in the evaporator 11 and provides an electrical signal indicative of this sensed temperature via the electrical lines 26 to the microcomputer system 21. Also, the temperature sensor 37 senses the temperature of the gaseous refrigerant entering the pistons of the compressor 12 (or, as discussed previously, the temperature sensor 37 senses the temperature of the gaseous refrigerant flowing or passing from the evaporator 11 to the compressor 12 at some other conventional location such as in the refrigerant line connecting the evaporator 11 to the compressor 12) and provides an electrical signal indicative of this sensed temperature via the electrical lines 28 to the microcomputer system 21. The microcomputer system 21 processes the electrical signals provided by the temperature sensors 35, 37 according to preprogrammed procedures to determine the temperature difference between the saturation temperature of the refrigerant in the evaporator 11 and the temperature of the gaseous refrigerant entering the compressor 12. This temperature difference is the superheat of the gaseous refrigerant entering the compressor 12.

Under normal operating conditions, the superheat of the gaseous refrigerant entering the compressor 12 falls within a certain normal range of values. A superheat value in excess of an upper limit of this normal range of superheat values usually indicates a malfunction in the refrigeration system. For example, if the expansion valve 14 is stuck closed or the filter-dryer 3 is plugged, this will abnormally restrict refrigerant flow to the evaporator 11. This results in overheating of the refrigerant in the evaporator 11 since less than the normal amount of refrigerant is present in the evaporator 11. In turn, overheating of the refrigerant in the evaporator 11 results in the superheat increasing above the upper limit of the normal range of superheat values. Also, if the superheat is less than a lower limit of the normal range of superheat values this is also usually indicative of a malfunction in the refrigeration system. For example, if the expansion valve 14 is stuck open more than the normal amount of refrigerant will flow into the evaporator 11 and little, if any, superheating of refrigerant will occur in the evaporator 11. If this condition continues unchecked, flooding of the compressor 12 may occur which could result in damage to the compressor 12.

Therefore, according to the present invention, the microcomputer system 21 periodically compares the detected superheat of the gaseous refrigerant entering the compressor 12 to an upper limit above which it is not desired to operate the refrigeration system. If the microcomputer system 21 detects that the superheat is above this selected upper limit then the microcomputer system 21 generates an alarm signal to shut down operation of the refrigeration system. Preferably, the alarm signal comprises a plurality of control signals which are provided from the microcomputer system 21 to appropriate switching devices on the system interface board 22 to discontinue power flow from the main power supply 23 to the motor 15 of the condenser fan unit 3 and to the motor driving the compressor 12. Also, preferably, control signals are generated by the microcomputer system 21 so that electrical power is supplied from the secondary power supply 24 via the electrical lines 31 to the motor 30 to drive the expansion valve 14 to its fully closed position.

The microcomputer system 21 also periodically compares the detected superheat of the gaseous refrigerant entering the compressor 12 to a lower limit below which it is not desired to operate the refrigeration system. If the microcomputer system 21 detects that the superheat is below this selected lower limit then the microcomputer system 21 generates an alarm signal to shut down operation of the refrigeration system as described above.

To avoid inadvertently shutting down operation of the refrigeration system in response to unharmful transient deviations of the detected superheat from the normal range of superheat values, the microcomputer system 21 may be programmed to time the duration of an occurrence of a detected superheat which is greater than the selected upper limit or which is less than the selected lower limit. No alarm signal is generated unless the detected abnormal superheat value is continuously present for a selected time interval, for example, such as a five minute time interval. Thus, electrical noise which may cause transient fluctuations in the electrical signals provided from the temperature sensors 35, 37 to the microcomputer system 21 are prevented from causing an undesired shutdown of the refrigeration system.

Further, the microcomputer system 21 may be programmed so that no alarm signal is generated even if the detected superheat is greater than the selected upper limit unless the saturation temperature of the refrigerant in the evaporator 11 is also simultaneously below another selected value indicating that the detected high superheat value is not the result of unusual, but unharmful, startup conditions for the refrigeration system. For example, if the refrigeration system is started when the refrigerant in the evaporator 11 is at a relatively high temperature this may result in a fairly rapid decrease in the saturation temperature in the evaporator 11 relative to the relatively high temperature of the gaseous refrigerant entering the pistons of the compressor 12 thereby resulting in a superheat value above the selected upper limit. However, this is a normal consequence of startup of the refrigeration system under these particular high temperature startup conditions and is not indicative of a malfunction in the refrigeration system. Therefore, it is not desired to shut down operation of the refrigation system under these circumstances. However, if the saturation temperature of the refrigerant in the evaporator 11 falls below a normal operating value and the detected superheat is not concurrently within the normal range of superheat values, this does indicate a possible malfunction in response to which it is desired to shut down operation of the refrigeration system. By programming the microcomputer system 21 to generate no alarm signal unless both the detected superheat is greater than the selected upper limit of the normal range of superheat values and the saturation temperature of the refrigerant in the evaporator is less than a selected normal operating value, the foregoing described operating conditions may be appropriately, effectively, and efficiently responded to in the desired manner.

Of course, the foregoing description is directed to a preferred embodiment of the present invention and various modifications and other embodiments of the present invention will be readily apparent to one of ordinary skill in the art to which the present invention pertains. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A method of operating a refrigeration system including a compressor for compressing gaseous refrigerant supplied to the compressor from an evaporator, comprising:

sensing the temperature of the gaseous refrigerant provided to the compressor from the evaporator;
   sensing the saturation temperature of the refrigerant in the evaporator;
   comparing the sensed temperatures to deterine the superheat of the gaseous refrigerant flowing from the evaporator to the compressor;
   shutting down operation of the refrigeration system when the superheat is continuously greater than a preselected upper limit for a first preselected amount of time and the sensed saturation temperature is simultaneously less than a preselected lower limit; and
   shutting down operation of the refrigeration system when the superheat is continuously less than a preselected lower limit for a second preselected amount of time.

2. A control system for operating a refrigeration system including a compressor for compressing gaseous refrigerant supplied to the compressor from an evaporator, comprising:

first sensor means for sensing the temperature of the gaseous refrigerant supplied to the compressor and for providing a first signal indicative of this sensed temperature;
   second sensor means for sensing the saturation temperature of the refrigerant in the evaporator and for providing a second signal indicative of this sensed temperature;
   processor means for receiving the first and second signals provided by the first and second sensor means, for processing the received signals according to preprogrammed procedures to determine the superheat of the gaseous refrigerant flowing from the evaporator to the compressor, and for generating an alarm signal when the superheat is continuously greater than preselected upper limit for a first preselectd amount of time and the sensed saturation temperature is simultaneously less than a preselected lower limit or the superheat is continuously less than a preselected lower limit for a second preselected amount of time; and
   means for shutting down operation of the refrigeration system in response to generation of an alarm signal by the processor means.

* * * * *